US012600599B2

(12) United States Patent
Schönauer et al.

(10) Patent No.: US 12,600,599 B2
(45) Date of Patent: Apr. 14, 2026

(54) FAULT CLASSIFICATION IN ELEVATOR SYSTEMS

(71) Applicant: Otis Elevator Company, Farmington, CT (US)

(72) Inventors: Uwe Schönauer, Berlin (DE); Prasanna Nagarajan, Farmington, CT (US)

(73) Assignee: OTIS ELEVATOR COMPANY, Farmington, CT (US)

( * ) Notice: Subject to any disclaimer, the term of this patent is extended or adjusted under 35 U.S.C. 154(b) by 1553 days.

(21) Appl. No.: 17/098,025

(22) Filed: Nov. 13, 2020

(65) Prior Publication Data

US 2021/0371242 A1 Dec. 2, 2021

(30) Foreign Application Priority Data

May 29, 2020 (EP) .................................... 20177590

(51) Int. Cl.
*B66B 5/02* (2006.01)
*B66B 1/30* (2006.01)

(52) U.S. Cl.
CPC . *B66B 5/02* (2013.01); *B66B 1/30* (2013.01)

(58) Field of Classification Search
CPC ........................................................ B66B 5/02
USPC .......................................................... 187/247
See application file for complete search history.

(56) References Cited

U.S. PATENT DOCUMENTS

| | | | | |
|---|---|---|---|---|
| 2013/0146399 | A1* | 6/2013 | De Coi | B66B 5/0031 187/393 |
| 2015/0053507 | A1 | 2/2015 | Kattainen et al. | |
| 2016/0009526 | A1 | 1/2016 | Mertala et al. | |
| 2017/0349398 | A1* | 12/2017 | Toutaoui | B66B 5/02 |
| 2018/0079622 | A1* | 3/2018 | Sirigu | B66B 5/0031 |
| 2018/0362292 | A1 | 12/2018 | Mustonen et al. | |

FOREIGN PATENT DOCUMENTS

| | | |
|---|---|---|
| CN | 104364177 A | 2/2015 |
| CN | 108217357 A | 6/2018 |
| CN | 108394775 A | 8/2018 |

(Continued)

OTHER PUBLICATIONS

Wang et al. (CN 106241540 A). Driving the Emergency Stop of the Auxiliary (Year: 2016).*

(Continued)

*Primary Examiner* — Jorge L Carrasquillo
(74) *Attorney, Agent, or Firm* — CANTOR COLBURN LLP

(57) ABSTRACT

An elevator system (2, 102) includes a drive system (10) including one or more drive components (11, 13) and drive hardware (15) for controlling the supply of power to the one or more drive components (11,13), a safety chain (16) arranged to break and thus interrupt a supply of power to the one or more drive components (11, 13) unless all of one or more safety condition(s) is satisfied; and a control device (12). The control device (12) is arranged to receive drive information from the drive hardware (15) indicative of a drive system fault; to receive safety chain information from the safety chain (16) indicative of a safety chain break; and to detect and classify a fault in the elevator system (2, 102) using the drive information and the safety chain information.

14 Claims, 9 Drawing Sheets

(56) References Cited

FOREIGN PATENT DOCUMENTS

| | | | |
|---|---|---|---|
| DE | 19826775 | A1 | 12/1999 |
| JP | 2018167957 | A | 11/2018 |

OTHER PUBLICATIONS

Tang (CN 108394775 A) Elevator Safety System and Safety Control Method (Year: 2018).*

European Search Report for application EP 20177590.5, dated Feb. 5, 2021, 66 pages.

Chinese Office Action for Application No. 202011399349.9, Issued Nov. 9, 2022, 6 Pages.

* cited by examiner

FAULT CLASSIFICATION IN ELEVATOR SYSTEMS

FOREIGN PRIORITY

This application claims priority to European Patent Application No. 20177590.5, filed May 29, 2020, and all the benefits accruing therefrom under 35 U.S.C. § 119, the contents of which in its entirety are herein incorporated by reference.

TECHNICAL FIELD

The present disclosure relates to fault classification in elevator systems.

BACKGROUND

Elevator systems typically comprise multiple independent safety mechanisms, to ensure safe operation. One such mechanism is a safety chain, which comprises a series of sensors connected in series, with each sensor arranged to monitor a respective safety condition in the elevator system. If any of the safety conditions is not met (e.g. if the hoistway doors are open, or if the elevator is travelling faster than an upper speed threshold), the corresponding sensor detects this and breaks the safety chain, which prevents operation of the elevator until the issue has been resolved.

Often a safety chain is implemented with a plurality of switches connected in series and arranged to carry an electrical signal (e.g. a DC voltage), that in turn can control the supply of power by drive hardware to drive components (e.g. a drive motor and/or a safety brake). Each of the switches may be associated with a safety condition (e.g. via a separate sensor or through direct mechanical action) and if any safety condition is not met (e.g. a hoistway door is open), the associated switch is opened, such that the electrical signal is interrupted and the supply of power to the drive components is cut (i.e. stopping motion of the drive motor and applying the safety brake). This is referred to as a safety chain break.

The safety chain normally functions independently to drive control software that controls the drive hardware in normal operation. However, this can make it difficult for faults to be quickly and accurately classified. For example, the drive control software may interpret a sudden drop in power output by the drive hardware due to a safety chain break as a fault with the drive hardware itself, causing confusion and the misclassification of faults. This can frustrate and/or delay diagnosis and repair of malfunctioning elevator systems.

The present disclosure seeks to improve fault classification in elevator systems.

SUMMARY

According to a first aspect of the present disclosure there is provided an elevator system comprising: a drive system comprising one or more drive components and drive hardware for controlling the supply of power to the one or more drive components; a safety chain arranged to break and thus interrupt the supply of power to the one or more drive components unless all of one or more safety condition(s) is satisfied; and a control device arranged: to receive drive information from the drive hardware indicative of a drive system fault; to receive safety chain information from the safety chain indicative of a safety chain break; and to detect and classify a fault in the elevator system using the drive information and the safety chain information.

From a second aspect of the present disclosure there is provided a method of classifying a fault in an elevator system, the elevator system comprising: a drive system comprising one or more drive components and drive hardware for controlling the supply of power to the one or more drive components; a safety chain arranged to break and thus interrupt the supply of power to the one or more drive components, unless all of one or more safety condition(s) is satisfied; and wherein the method comprises: receiving drive information from the drive hardware indicative of a drive system fault; receiving safety chain information from the safety chain indicative of a safety chain break; and detecting and classifying a fault in the elevator system using the drive information and the safety chain information.

Thus, it will be appreciated by those skilled in the art that the elevator system is able to classify faults accurately and reliably, because information from both the drive hardware and the safety chain is used for fault classification. For example, even if drive information indicating a drive system fault were to arrive before safety chain information indicating a safety chain break, the control device would still take both into account when classifying the fault. This means the elevator system is more likely to classify the fault correctly, e.g., allowing a repair technician to more quickly identify and resolve the fault.

In some sets of examples, the control device is arranged to determine an order in which the drive information indicative of a drive system fault and the safety chain information indicative of a safety chain break is received, and to use the order to classify the fault. Additionally or alternatively, the control device may be arranged to determine a time or times at which the drive information and/or the safety chain information is received and to use the time(s) to classify the fault. For example, if safety chain information from the safety chain indicating a safety chain break is received before drive information from the drive hardware indicating a drive system fault is received, the control device may classify the fault as a safety chain break, because the drive information indicative of a drive system fault is assumed to have arisen as a result of the safety chain break, and not because of an underlying drive system fault.

In some sets of examples, the safety chain is arranged to break and thus interrupt a supply of power to the one or more drive components on reception of a safety chain break command from the control device. This allows the control device to break the safety chain itself by issuing a safety chain break command, e.g. if a drive hardware fault, system fault or other safety issue is detected by software, or if a user wishes to trigger a safety chain break for testing or diagnostic purposes. In some such examples, the control device may be arranged to issue a safety chain break command to the safety chain on reception of drive information from the drive hardware indicative of a drive system fault, i.e. as a quick and convenient way of ensuring the drive component(s) is disabled whilst the apparent drive system fault is investigated and resolved.

Because issuing of a safety chain break command causes a safety chain break, the control device expects to receive subsequently safety chain information from the safety chain indicative of a safety chain break. Due to inherent latencies in components such as relays and filters through which the safety chain information and/or the safety chain break command may pass, there is a minimum expected propagation time it should take for this safety chain information to arrive after issuing the safety chain break command. This minimum expected propagation time may be inherent in the hardware used to implement the safety chain and the safety chain break command and may thus be known to the control device in advance (e.g. hard-coded into the control device during manufacture or provided via a software update). The control device may also be arranged to learn the minimum expected propagation time during operation, e.g. via a calibration procedure.

By analysing the time delay between issuing a safety chain break command and receiving safety chain information indicative of a safety chain break, the control device can thus distinguish between a safety chain break caused by the control device itself, and a safety chain break that has occurred for another reason. Thus, in some examples, the control device is arranged: to issue a safety chain break command to the safety chain on reception of drive information from the drive hardware indicative of a drive system fault; to measure a time delay between issuing the safety chain break command and receiving safety chain information from the safety chain indicative of a safety chain break; to determine if the time delay is less than a minimum expected propagation time; and if the time delay is less than the minimum expected propagation delay, to classify the fault as a safety chain break.

In other words, if, upon reception of drive information indicative of a drive system fault, the control device issues a safety chain break command but then receives safety chain information from the safety chain indicating a safety chain break earlier than expected, the control device determines that the detected drive system fault was actually the result of a preceding separate safety chain break and classifies the fault accordingly. In some such examples the control device may be arranged, if the time delay is equal to or greater than the minimum expected propagation delay, to classify the fault as a drive system fault (i.e. if the time delay is consistent with that expected for a safety chain break caused by the safety chain break command).

The safety chain may be arranged to carry a safety chain signal (e.g. an electrical signal) to an end of the safety chain when all of the one or more safety condition(s) is satisfied. In such examples, the presence of the safety chain signal at the end of the safety chain indicates that all of the one or more safety condition(s) is satisfied and the absence of the safety chain signal at the end of the safety chain indicates that at least one of the one or more safety condition(s) is not satisfied.

For example, the safety chain may comprise a plurality of electrical switches connected in series via a conducting path and be arranged to carry an electrical safety chain signal to an end of the conducting path, wherein each of the switches is arranged to break the safety chain by interrupting the conducting path unless a respective safety condition is satisfied. Thus, if any of the safety condition(s) is not met, the corresponding switch interrupts the conducting path and the electrical safety chain signal is no longer carried to the end of the conducting path, breaking the safety chain. The switches may in the most general sense be any mechanism for interrupting the conducting path. For example a mechanical switch can simply be two electrical conductors that are caused to move between a contacting state and a non-contacting state. Equally other forms of switch may be used such as relays or thermal switches or other electromechanical or magnetic switches. Other, non-mechanical switches, e.g. semiconductor switches such as transistors may also be used. Circuit breakers and/or fuses may also be used in the safety chain. The electrical safety chain signal may comprise a DC electrical signal with a nominal voltage, or an AC electrical signal, e.g. with a nominal frequency and/or peak-to-peak voltage.

In some such examples, one or more of the plurality of switches may be controlled by a corresponding sensor that is arranged to monitor the respective safety condition. For example, an overspeed sensor may control one of the plurality of switches to interrupt the conducting path if it detects an elevator car travelling above a maximum speed limit. Additionally or alternatively, one or more of the plurality of switches may itself monitor a safety condition. For example, the plurality of switches may comprise a reed switch arranged to interrupt the conducting path if a hoistway door of the elevator system is open. Safety conditions monitored by the plurality of switches (or corresponding sensors) may include hoistway doors being closed, elevator car doors being closed, an elevator car speed being within predetermined limits, an elevator car position not exceeding predetermined limits, an elevator car being within a door zone while doors are open, a buffer being compressed, and rope tension being above or below predetermined limits.

In some examples in which the safety chain is arranged to break on reception of a safety chain break command from the control device, the safety chain may comprise a further switch arranged to break the safety chain by interrupting the conducting path on reception of the safety chain break command from the control device.

The control device may be arranged to receive safety chain information comprising the presence or absence of the electrical safety chain signal at the end of the conducting path (i.e. where the absence of the electrical safety chain signal is indicative of a safety chain break at any point along its length). For example, the control device may be connected to the end of the conducting path (downstream of the one or more switches) and be arranged to detect the presence or absence of the electrical safety chain signal at the end of the conducting path. In such examples, if any of the switches breaks the safety chain, the absence of the electrical safety chain signal at the end of the conducting path is detected by the control device as indicative of a safety chain break. In some such examples, the control device may be connected to the conducting path via one or more filters or amplifiers. For instance, the control device may be connected to the conducting path via a low pass filter, to mitigate transient changes in the electrical safety chain signal (e.g. a short drop in voltage due to noise or interference) being interpreted by the control device as a safety chain break. In practice, the safety chain may traverse a long path throughout the hoistway and as such is exposed to potentially significant quantities of interference which can affect the signal. The filter used to smooth out the safety chain signal may therefore be complex, adding a delay to the signal as it is processed by the filter. This delay means that changes in the state of the safety chain signal may not propagate to the control device as rapidly as the loss of power caused by disconnecting the power supply to the one or more drive components.

The drive system may comprise a drive controller arranged to control the drive hardware to supply power to the drive motor to move the elevator car, e.g. in response to an elevator call. For instance, the drive hardware may be arranged to convert electricity from a main power supply (e.g. a 3-phase power supply) into electrical drive signals that power the drive motor and/or a safety brake according to control signals from the drive controller. In some examples the drive hardware comprises a converter that converts an AC (e.g. 3-phase) power supply into DC power, and an inverter to convert the DC power into AC drive signals. The inverter may, for example, comprise a series of switching devices controlled by the drive controller to produce AC drive signals with precisely the voltage and frequency necessary to drive the drive motor in a particular direction and at a particular speed. Such an arrangement may be referred to as a variable-voltage variable-frequency drive.

In some examples, the drive controller comprises the control device. This may be convenient because the drive controller is already in direct communication with the drive hardware and can thus receive drive information with minimal delay. However, in some examples the control device may be provided by or as part of another device e.g. an elevator controller or a dedicated fault classification device.

The drive information may comprise one or more of a power, current or voltage output of the drive hardware. For instance, a dip or spike in the power output of the drive hardware may indicate a fault in the drive system (e.g. a fault with a drive motor causing it to consume less power or more power than expected).

The one or more drive components may comprise a drive motor arranged to drive an elevator car of the elevator, a safety brake arranged to brake an elevator car of the elevator system directly and/or a safety brake arranged to brake a drive motor, pulley or sheave of the elevator system. In such examples, interrupting the power supply to the one or more drive components has the effect of slowing the elevator car, e.g. bringing the elevator car to a halt as quickly as is safely possible (i.e. an emergency stop). For instance, interrupting power to a drive motor stops drive force being applied to the elevator car and may actually decelerate the car due to mechanical resistance or a reluctance torque within the motor. A safety brake is typically arranged to be held out of engagement by a continuous supply of power, such that interrupting power to the safety brake causes the brake to be applied, slowing the elevator car.

A drive system fault may be a fault caused by any of the elements of the drive system including the one or more drive components, drive hardware or a drive controller. For instance, a drive system fault may occur if a switching device of the drive hardware fails, or if a drive motor fails.

In relevant examples, the electrical safety chain signal may control the supply of power to the one or more drive components. For example, the system may be arranged to supply power to the drive component(s) when the electrical safety chain signal is present at the end of the conducting path, and to interrupt a supply of power to the drive component(s) when the electrical safety chain signal is absent from the end of the conducting path. Interrupting the supply of power to the drive component(s) may comprise cutting the supply of power entirely (e.g. cutting a supply of power input to the drive hardware). For example, the system may comprise a power supply switch (e.g. an electrical relay) controlled by the electrical safety chain signal and via which the drive component(s) is supplied with power. In such examples, the power supply switch may be connected to the end of the conducting path and be arranged to conduct power only when the safety chain signal is present at the end of the conducting path (i.e. so that power to the drive component(s) is interrupted when the safety chain signal is absent). However, in some examples, additionally or alternatively, interrupting the supply of power to the one or more drive components may comprise disrupting drive signals (e.g. AC drive signals) output by the drive hardware such that they do not effectively induce movement of a drive motor.

Classifying the fault may comprise assigning a classification to the fault from a list of known fault types, e.g. distinguishing between system faults (such as a safety chain break) and drive system faults. In some examples, classifying the fault may comprise assigning a technical classification to the fault (i.e. corresponding to its technical nature). For example, classifying the fault may comprise assigning it to one or more technical categories selected from a list including: Information events, Inverter Current faults, Converter Current faults, Voltage faults, Brake faults, Motion faults, Temperature faults, State faults, Task Overrun faults, Communication faults.

In some examples, classifying the fault may comprise determining additional information regarding the fault (e.g. identifying a component from which it originated, or determining a time at which it occurred). The elevator system may be arranged to record the occurrence of the fault, its classification and/or additional information regarding the fault (e.g. for later review by a technician).

In some sets of embodiments, additionally or alternatively, the control device is arranged to receive safety chain information comprising one or more properties of the electrical safety chain signal carried by the safety chain (i.e. beyond its mere presence or absence) and to use the safety chain information to detect and/or classify the fault. The control device may be arranged to monitor directly the one or more properties (e.g. the control device may comprise an integral voltage and/or frequency sensor connected directly to the safety chain), although in some examples a separate monitoring device (e.g. a dedicated voltage and/or frequency sensor) in communication with the control device may be used, e.g. to facilitate retrofitting an existing elevator system. In some examples the sensors that are already present in a drive controller or drive hardware (e.g. voltage and current sensors) are used for a cost-effective solution which only requires the addition of signal routing from the safety chain to the sensors in order to retrofit an existing system.

The control device may be arranged to detect and/or classify a fault by comparing the one or more properties of the electrical safety chain signal to a predetermined threshold. In some examples, the control device may be arranged to detect and/or classify a fault by identifying a characteristic behaviour of one or more properties of the electrical safety chain signal over time. For example, the control device may be arranged: to receive safety chain information comprising a plurality of measurements of one or more properties of the electrical safety chain signal carried by the safety chain; to identify a characteristic behaviour of one or more properties of the electrical safety chain signal using the plurality of measurements; and to classify a fault in the elevator system using the identified characteristic behaviour.

For instance, the control device may be arranged to determine from the plurality of measurements (i.e. measured at a plurality of different times) a number, duration and/or magnitude of deviations in the one or more properties of the electrical safety chain signal from a nominal value (e.g. deviations of the voltage of an electrical safety chain signal from a nominal voltage). For example a drop in voltage may be indicative of a power supply fault. The control device may, additionally or alternatively, be arranged to determine a maximum or minimum of one or more properties of the electrical safety chain signal within a certain time window. The control device may correlate the safety chain signal with other data such as other elevator operational data to classify or assist in classifying a fault. For example, correlating the detected data with the timing of door opening commands may indicate a door fault. The control device may be arranged to determine a value of one or more health metrics for the safety chain based on safety chain information.

The safety chain information may comprise a plurality of measurements of one or more continuously variable properties of the electrical safety chain signal (i.e. a property that does not assume one of several discrete values), such as a voltage or a frequency of the electrical safety chain signal.

The control device may be arranged only to receive safety chain information when a safety chain break occurs or is resolved (e.g. when an electrical safety chain signal is interrupted or restored). This may be achieved by connecting the control device to the conducting path via a low-pass filter, which filters out high speed transient changes in the electrical safety chain signal that are not due to a safety chain break. However, in some examples the control device is arranged to receive safety chain information comprising one or more properties of the electrical safety chain signal substantially continuously (e.g. at a high sampling frequency such as 10 times a second or faster, such as 50 or 100 times a second or faster) regardless of the state of the safety chain. This may allow the control device to identify a safety chain break more quickly. For example, the control device may be arranged to compare the one or more properties of the electrical safety chain signal to one or more predetermined thresholds or criteria to determine if a safety chain break has occurred. The one or more properties of the electrical safety chain signal information may even indicate a safety chain break before it has had any effect on the drive hardware, allowing the control device to detect the safety chain break before drive information indicative of a drive system fault is received by the control device, reducing ambiguities and reducing the likelihood of faults being misclassified.

The control device may be arranged to store safety chain information. The control device may be arranged to classify retroactively a fault based on stored safety chain information. For example, the control device may receive drive information indicative of a drive system fault, and then review previous safety chain information to see if the drive system fault may have been the result of an earlier safety chain break.

Direct monitoring of an electrical safety chain signal is itself believed to be independently inventive. For instance, the behaviour of the voltage or frequency of the electrical safety chain signal may be analysed (e.g. in real-time or retroactively) to determine a source or type of fault, improving the speed and accuracy of fault classification compared to existing approaches. Thus, from a third aspect the present disclosure provides an elevator system comprising: a drive system comprising one or more drive components and drive hardware for controlling the supply of power to the one or more drive components; a safety chain comprising a plurality of electrical switches connected in series via a conducting path and arranged to carry an electrical safety chain signal to an end of the conducting path, wherein each of the switches is arranged to break the safety chain by interrupting the conducting path unless a respective safety condition is satisfied, wherein breaking the safety chain causes the power supply to the one or more drive components to be interrupted; and a control device arranged: to receive safety chain information comprising a plurality of measurements of one or more properties of the electrical safety chain signal carried by the safety chain; to identify a characteristic behaviour of one or more properties of the electrical safety chain signal using the plurality of measurements; and to classify a fault in the elevator system using the identified characteristic behaviour.

From a fourth aspect the present disclosure provides a method of classifying a fault in an elevator system, the elevator system comprising: a drive system comprising one or more drive components and drive hardware for controlling the supply of power to the one or more drive components; and a safety chain comprising a plurality of electrical switches connected in series via a conducting path and arranged to carry an electrical safety chain signal to an end of the conducting path, wherein each of the switches is arranged to break the safety chain by interrupting the conducting path unless a respective safety condition is satisfied, wherein breaking the safety chain causes the power supply to the one or more drive components to be interrupted; wherein the method comprises: receiving safety chain information comprising a plurality of measurements of one or more properties of the electrical safety chain signal carried by the safety chain; identifying a characteristic behaviour of one or more properties of the electrical safety chain signal using the plurality of measurements; and classifying a fault in the elevator system using the identified characteristic behaviour.

The one or more properties may comprise one or more continuously variable properties of the electrical safety chain signal (i.e. a property that does not assume one of several discrete values), such as a voltage or a frequency of the electrical safety chain signal.

In some examples, the control device may be arranged to determine from the plurality of measurements (i.e. measured at a plurality of different times) a number, duration and/or magnitude of deviations in the one or more properties of the electrical safety chain signal from a nominal value (e.g. deviations of the voltage of an electrical safety chain signal from a nominal voltage). For example a drop in voltage may be indicative of a power supply fault. The control device may, additionally or alternatively, be arranged to determine a maximum or minimum of one or more properties of the electrical safety chain signal within a certain time window. The control device may correlate the safety chain signal with other data such as other elevator operational data to classify or assist in classifying a fault. For example, correlating the detected data with the timing of door opening commands may indicate a door fault. The control device may be arranged to determine a value of one or more health metrics for the safety chain based on safety chain information.

The control device may be arranged to measure directly the one or more properties (e.g. the control device may comprise an integral voltage and/or frequency sensor connected directly to the safety chain), although in some examples a separate monitoring device (e.g. a dedicated voltage and/or frequency sensor) in communication with the control device may be used, e.g. to facilitate retrofitting an existing elevator system. In some examples the sensors that are already present in a drive controller or drive hardware (e.g. voltage and current sensors) are used for a cost-effective solution which only requires the addition of signal routing from the safety chain to the sensors in order to retrofit an existing system.

The control device or separate monitoring device may be arranged to measure one or more properties of the electrical safety chain signal substantially continuously (e.g. at a high sampling frequency such as 10 times a second or faster, such as 50 or 100 times a second or faster).

The control device may be arranged to store safety chain information (i.e. to store the plurality of measurements). The control device may be arranged to classify retroactively a fault based on stored safety chain information.

Features of any aspect or example described herein may, wherever appropriate, be applied to any other aspect or example described herein. Where reference is made to different examples, it should be understood that these are not necessarily distinct but may overlap. It will be appreciated that where appropriate all of the preferred features of the elevator system and method according to the first and second aspects described above may also apply to the third and fourth aspects of the disclosure.

DRAWING DESCRIPTION

One or more non-limiting examples will now be described, by way of example only, and with reference to the accompanying figures in which.

DETAILED DESCRIPTION

Figure 1:
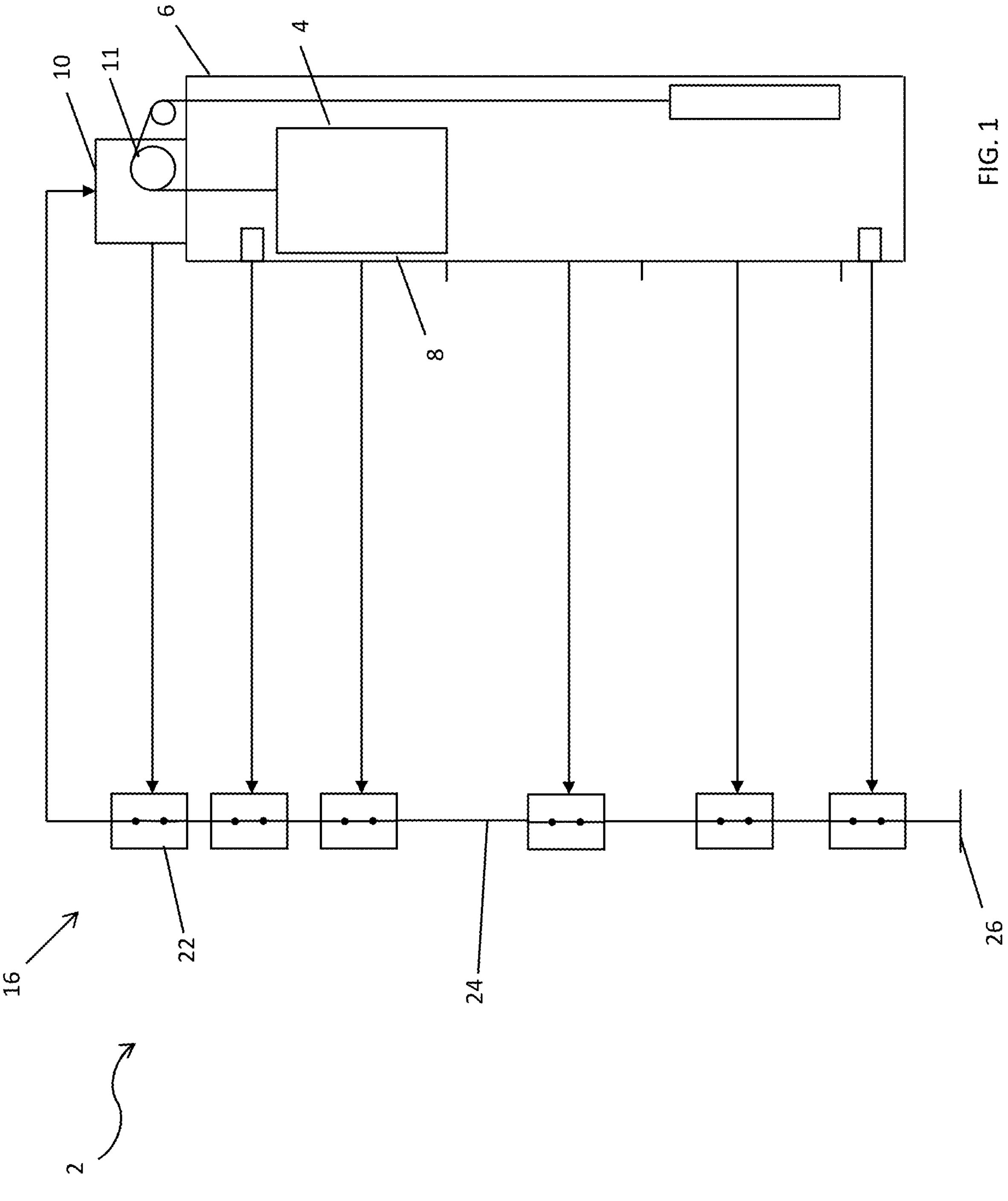
FIGS. 1 and 2 are schematic views of an elevator system according to an example of the present disclosure.
Figure 2:
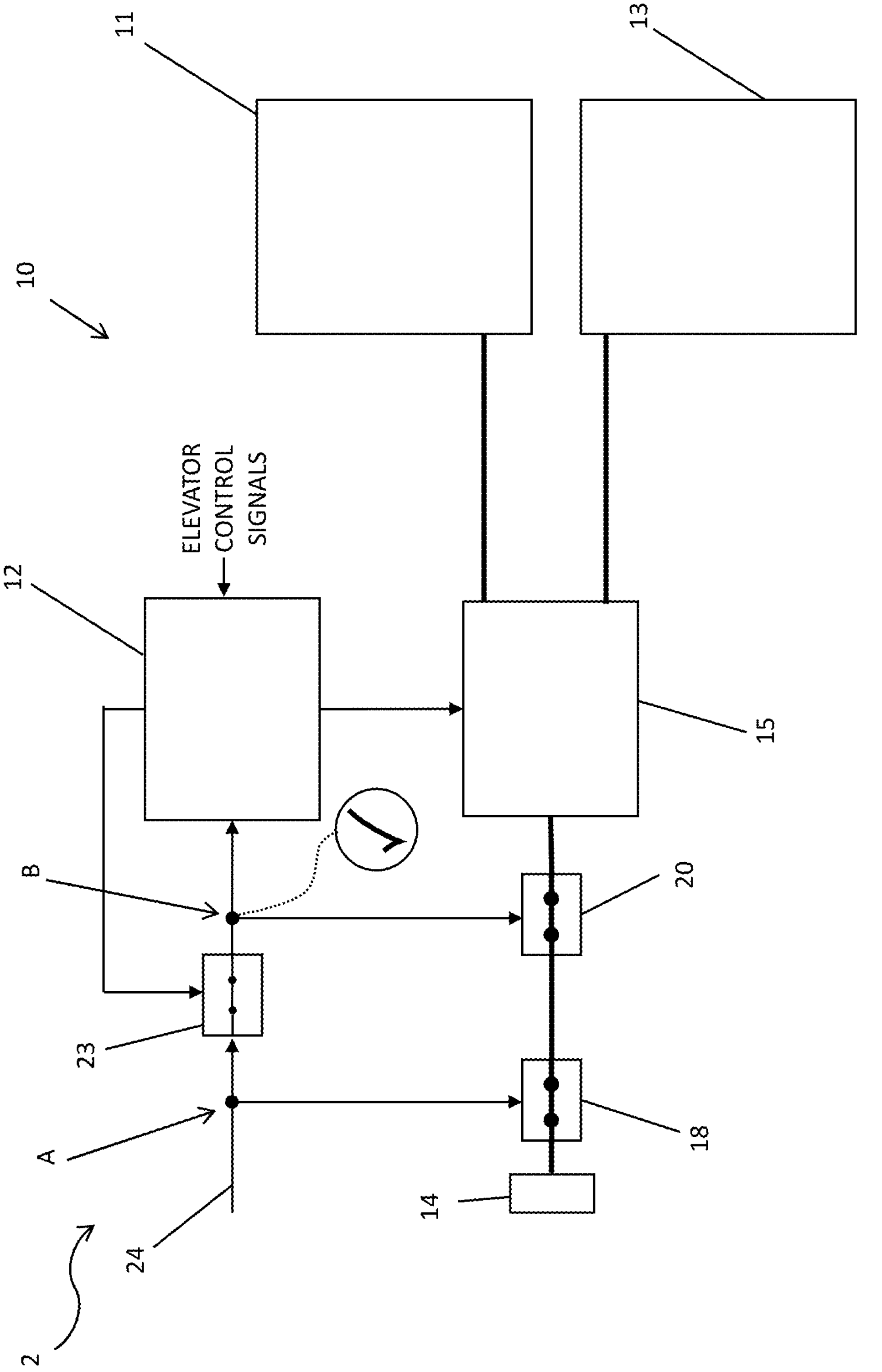

FIGS. 1 and 2 show an elevator system 2 comprising an elevator car 4 that is driven to move up and down a hoistway 6 to serve a plurality of landings of a building. Hoistway doors 8 facilitate access to the elevator car 4 from each landing. The elevator system 2 also comprises a drive system 10 and a safety chain 16. As shown in more detail in FIG. 2, the drive system 10 comprises a drive control device 12, drive hardware 15, a drive motor 11 arranged to drive the elevator car 4, and an electromagnetic safety brake 13 arranged to engage and stop the elevator car 4 when it is not provided with power. The drive control device 12 is arranged to control using the drive hardware 15 the supply of power from a power supply 14 to the drive motor 11 and the electromagnetic safety brake 13 (e.g. in response to control signals from an elevator controller, not shown).

The safety chain 16 comprises a plurality of electrical switches 22 connected in series via a conducting path 24. The switches 22 are arranged to open and break the safety chain 16 unless respective safety conditions are satisfied. The safety conditions include the hoistway doors 8 being closed, the elevator car 4 speed being below an overspeed limit and the elevator car 4 position in the hoistway 6 being within predetermined upper and lower limits. Although not illustrated, further switches corresponding to further safety conditions may also be provided. One end of the safety chain 16 is connected to a DC voltage source 26 which provides a DC electrical safety chain signal (e.g. a positive voltage), although in other examples an AC source may be used to provide an AC electrical safety chain signal. As shown in FIG. 1, when all the switches 22 are closed (i.e. when all the safety conditions are satisfied), the electrical safety chain signal from the DC voltage source 26 is carried to the other end of the safety chain 16 (i.e. the electrical safety chain signal is present at the node labelled B in FIG. 2).

Each of the switches 22 may monitor a safety condition directly (e.g. a switch 22 may comprise a reed switch coupled to a hoistway door 8 to monitor directly whether it is open or closed) or indirectly (e.g. a switch 22 may comprise a relay controlled by a separate hoistway door sensor).

The plurality of electrical switches 22 includes a software-controlled switch 23 which is controlled by drive software running on the drive controller 12. The software-controlled switch 23 is configured to open and break the safety chain upon receiving of a safety chain break command from the drive controller 12. This allows the drive controller 12 to break the safety chain 16 by issuing a safety chain break command, for example if the drive controller 12 itself detects a safety issue or a user wishes to trigger a safety chain break via software running on the drive controller 12. The drive controller 12 is, for instance, configured to issue a safety chain break command to the software-controlled switch 23 if it detects a problem with the supply of power to the drive motor 11 or the safety brake 13.

The safety chain 16 can itself exert control over the supply of power to the drive motor 11 and the safety brake 13 using the first and second power supply relays 18, 20 (two relays are provided to provide redundancy). When either of the first and second power supply relays 18, 20 is open (i.e. not conducting), the supply of power to the drive motor 11 and the safety brake 13 is interrupted. The first and second power supply relays 18, 20 are controlled by the safety chain 16. The first power supply relay 18 is configured to conduct only when the electrical safety chain signal is present at the node labelled A. Similarly, the second power supply relay 20 is configured to conduct only when the electrical safety chain signal is present at the node labelled B. Thus, if any of the plurality of switches 22 is open (i.e. if any one of the safety conditions is not satisfied), the supply of power is interrupted, thus automatically stopping the drive motor 11 and applying the safety brake 13.

In use, the drive controller 12 controls the supply of power to the drive motor 11 and the safety brake 13 by sending control signals to drive hardware 15 (e.g. comprising a plurality of switching devices that facilitate variable-voltage/variable-frequency control of the drive motor 11). For example, the drive controller 12 may cause power to be supplied to the drive motor 11 in response to an instruction from the elevator controller to move the elevator car 4 upwards (e.g. in response to an elevator call). At the same time, the drive controller 12 monitors the supply of power to the drive motor 11 and safety brake 13, receiving drive information from the drive hardware 15 indicative of the voltage, current, and/or power supplied by the drive hardware 15 to the drive motor 11 and the safety brake 13. If a drive system fault occurs (e.g. an electrical fault causing the drive motor 11 to fail) this is indicated by the drive information provided to the drive controller 12 (e.g. indicated by a sudden drop in the power supplied to the drive motor 11).

Similarly, the drive controller 12 is arranged to receive safety chain information from the safety chain 16. In this example the safety chain information comprises an indication of whether the safety chain signal is present at the node labelled B (i.e. at the end of the safety chain 16). The safety chain information thus provides an indication of whether the safety chain is intact (when the electrical safety chain signal is present at node B) or if there has been a safety chain break (when the electrical safety chain signal is absent from node B). Although not illustrated, the safety chain information from node B passes through a low pass filter to prevent transient changes in the electrical safety chain. In some examples, additionally or alternatively, a low pass filter may be located to the left of node B.

Figure 3:
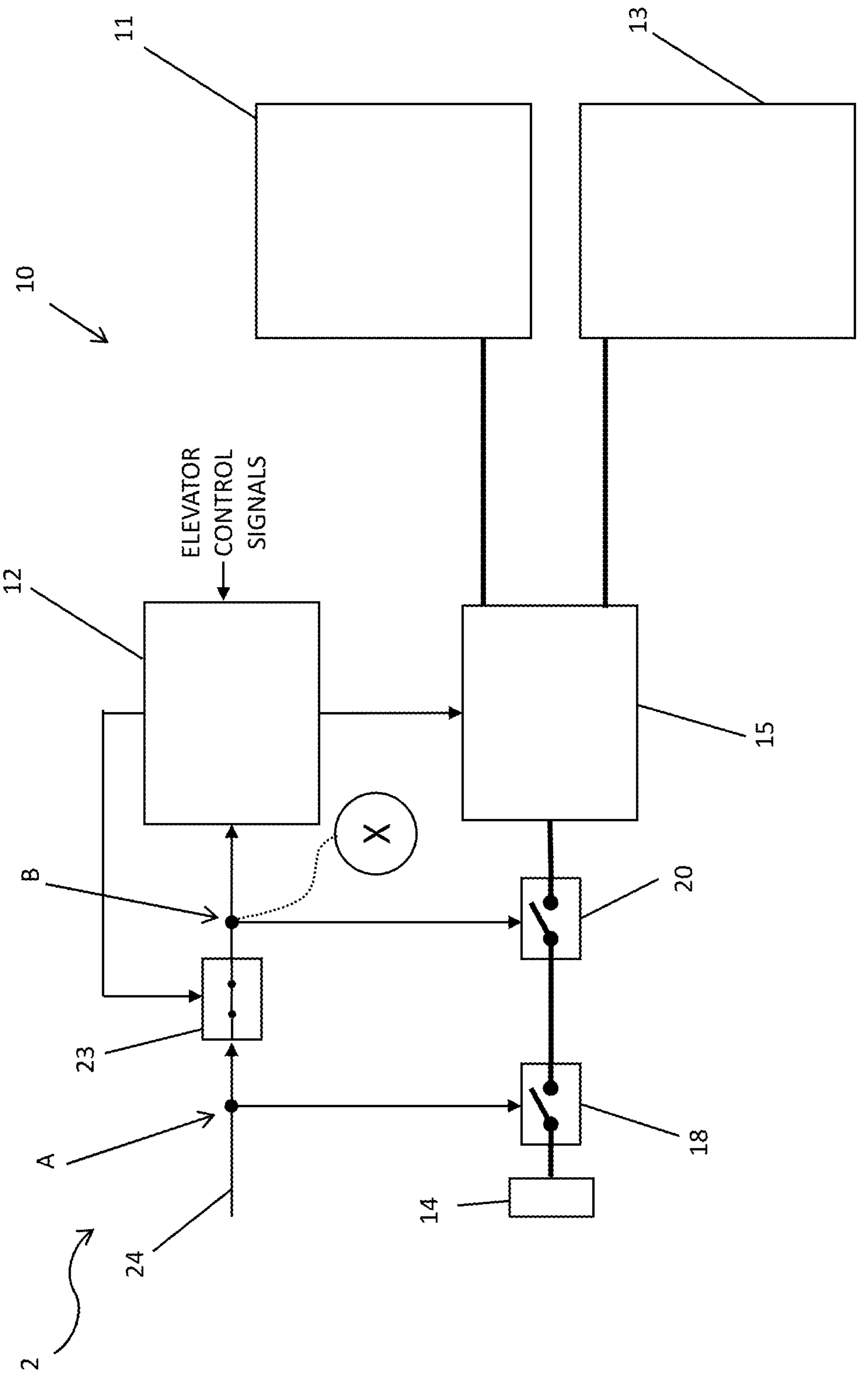
FIGS. 3 and 4 are partial schematic views of the elevator system when a safety chain break occurs.
Figure 4:
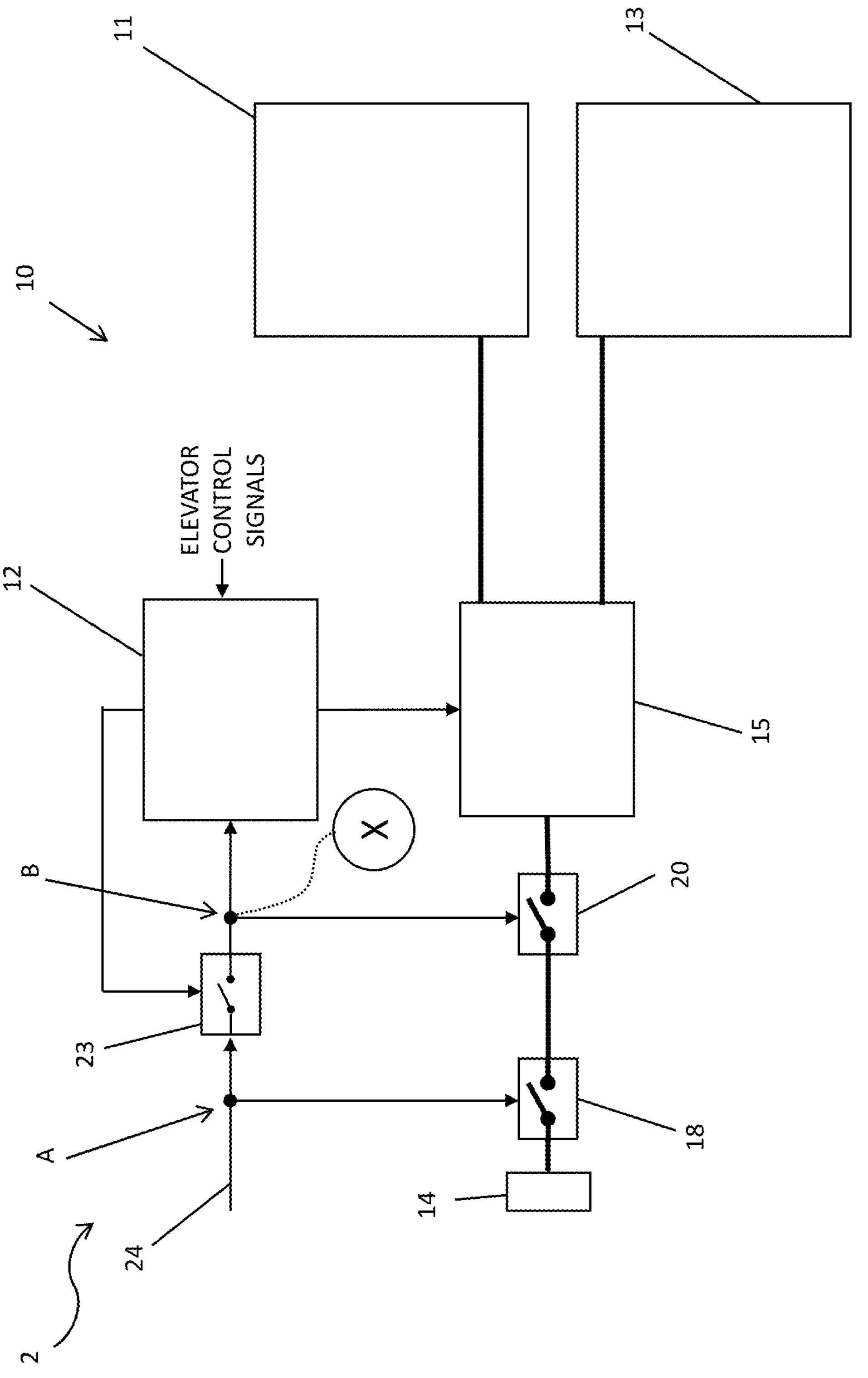
Figure 5:
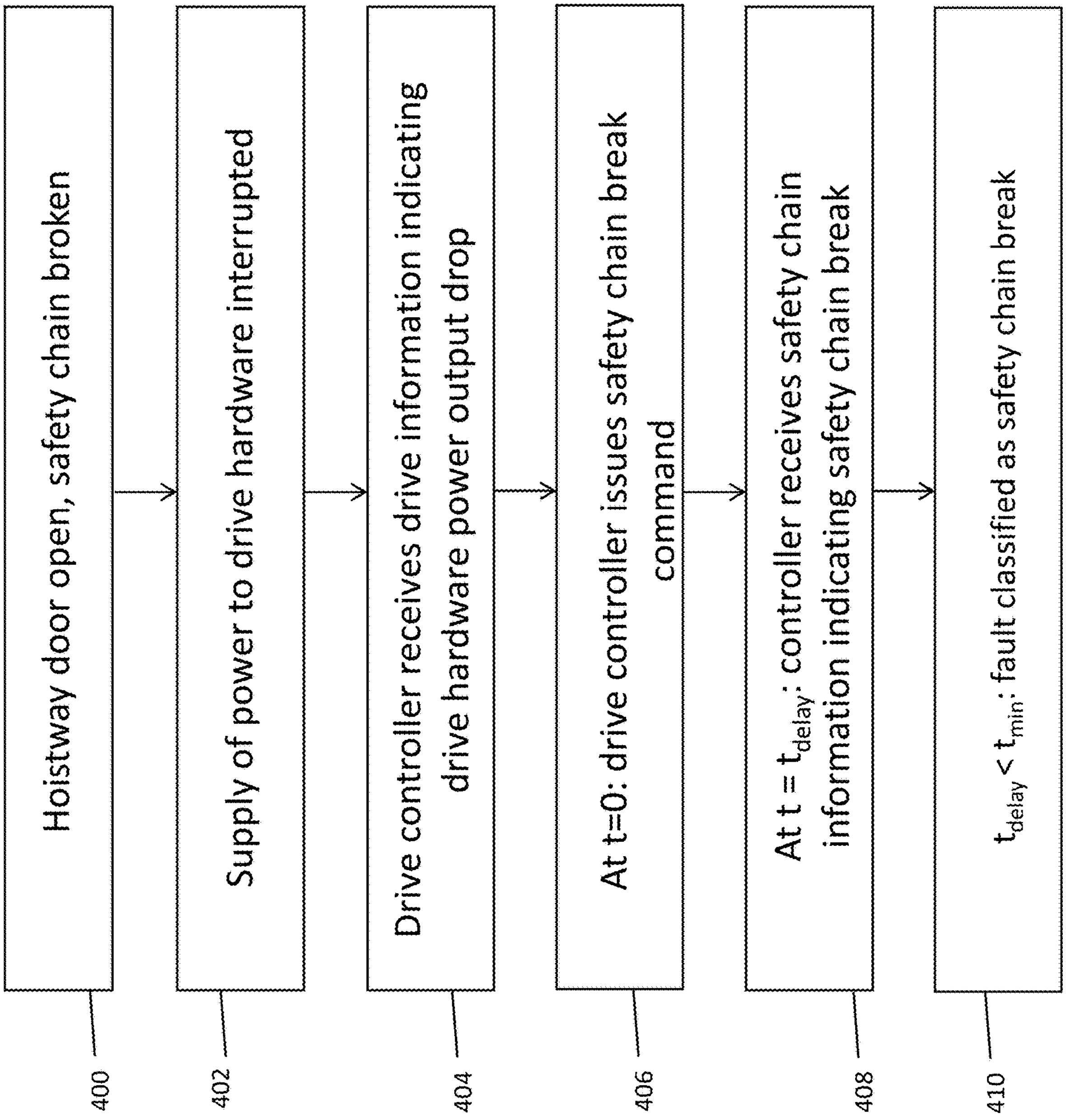
FIG. 5 is a flow diagram illustrating the operation of the elevator system when a safety chain break occurs.

The operation of the elevator system 2 when a safety chain break occurs will now be explained with reference to FIGS. 3, 4, and 5.

At step 400, a hoistway door 8 is erroneously left open (e.g. due to a failure of its closing mechanism), causing its corresponding switch 22 to open and break the safety chain 16 (see FIG. 2). Because the electrical safety chain signal is no longer carried to nodes A or B, the first and second power supply relays 18, 20 open and the supply of power to the drive hardware 15 (and thus to the drive motor 11 and safety brake 13) is interrupted (step 402), as shown in FIG. 2. This stops the drive motor 11 and applies the safety brake 13, bringing the elevator car 4 to a halt (or preventing it from moving if it is already stopped).

At step 404, the drive controller 12 receives drive information from the drive hardware 15 indicating a sudden drop in power output to the drive motor 11 and safety brake 13 (due to the interruption of the power supply). The drive controller 12, which is not yet aware of the safety chain break (e.g. due to an inherent latency of the low pass filter through which safety chain information must pass), identifies this as a potential drive hardware (or drive motor/safety brake) problem and issues a safety chain break command to the software-controlled switch 23 in step 406, which opens as shown in FIG. 3. The safety chain break command is issued at t=0.

Subsequently in step 408, the safety chain information (i.e. the absence of the electrical safety chain signal at node B) indicative of the original safety chain break (i.e. caused by the open hoistway door 8) is received by the controller 12. The safety chain information is received at $t=t_{delay}$ The drive controller 12 recognises that $t_{delay}$ is less than the minimum propagation time $t_{min}$ it would take for safety chain information indicative of a safety chain break caused by the safety chain break command to be received by the drive controller 12. The drive controller 12 thus recognises that the safety chain information must be indicative of an independent safety chain break and that this must be the underlying cause of the drop in power output to the drive motor 11 and safety brake 13. The drive controller 12 thus, in step 410, classifies the fault as a safety chain break. The minimum delay $t_{min}$ is made up of the signal propagation delay along the control line from the controller 12 to the software-controlled switch 23, the activation time of the software-controlled switch 23 which breaks the safety chain 16 and the signal propagation delay from the software-controlled switch 23 to the controller 12 along the end of the safety chain 16. This latter path between the software-controlled switch 23 and the controller 12 may include a filter to process the safety chain signal, in which case the total delay also includes the signal delay introduced by that filter.

Figure 6:
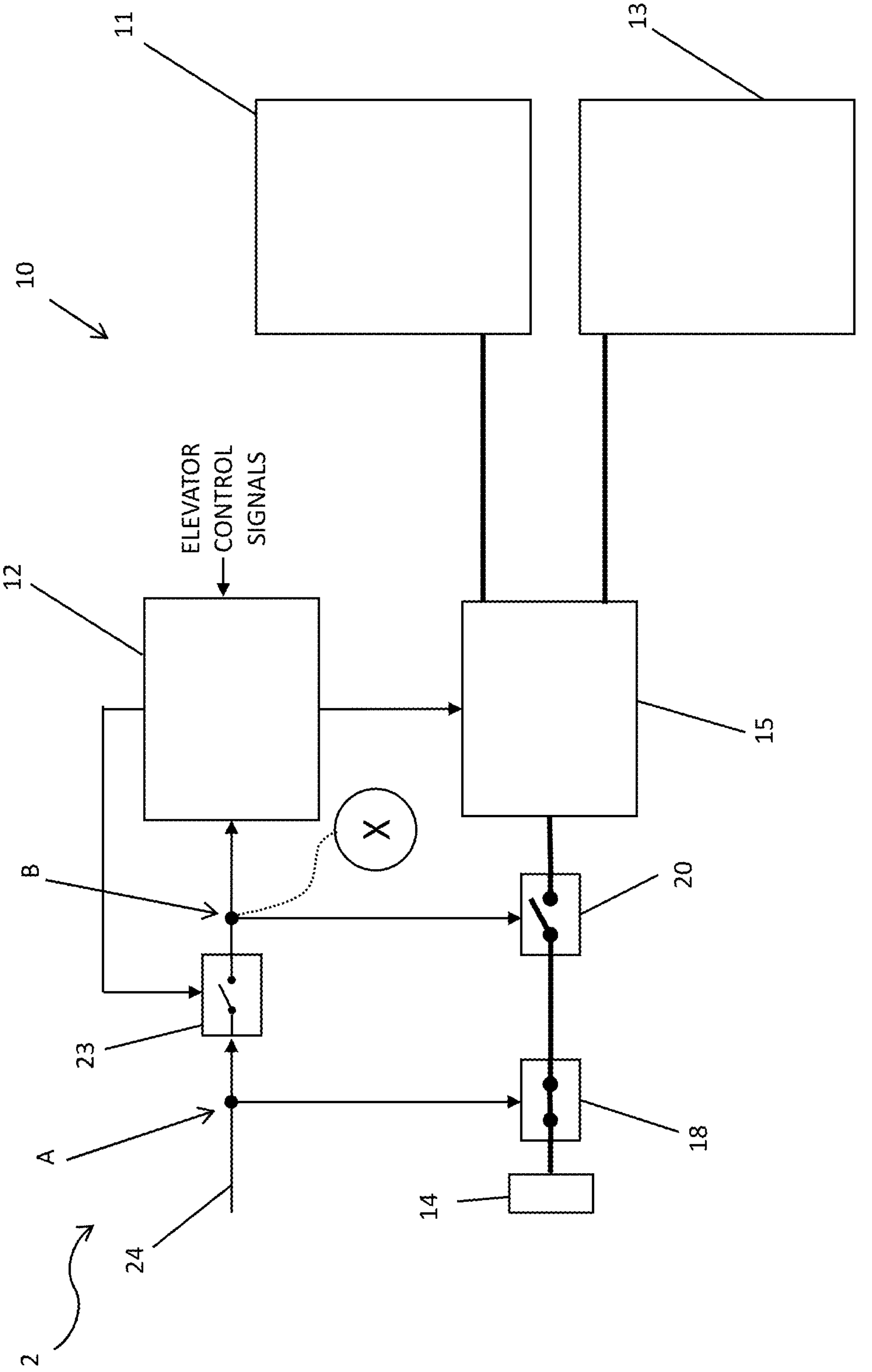
FIG. 6 is a partial schematic view of the elevator system when a drive system fault occurs.
Figure 7:
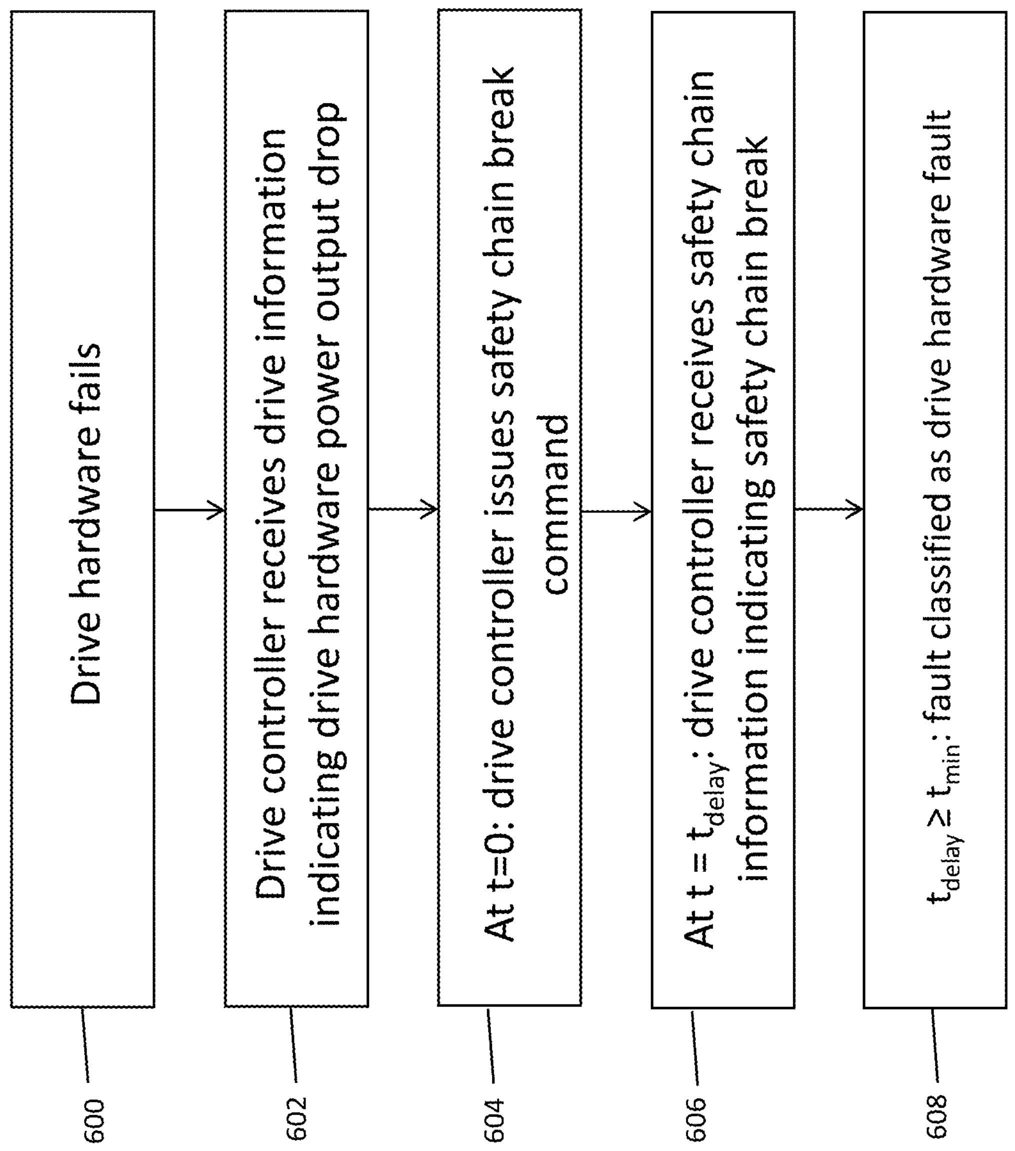
FIG. 7 is a flow diagram illustrating the operation of the elevator system when a drive system fault occurs.

The operation of the elevator system 2 when a drive system fault occurs will now be explained with reference to FIGS. 6 and 7.

At step 600, the drive hardware 15 fails (e.g. due to an electrical fault), causing the power output by the drive hardware 15 to drop suddenly. At step 602, the drive controller 12 receives drive information from the drive hardware 15 indicating the sudden drop in power output. The drive controller 12, identifies this as a potential drive hardware problem and issues a safety chain break command to the software-controlled switch 23 in step 604, which opens and breaks the safety chain 16, as shown in FIG. 5. The safety chain break command is issued at t=0.

Subsequently in step 606, safety chain information (i.e. the absence of the electrical safety chain signal at node B) indicative of the safety chain break is received by the drive controller 12. The safety chain information is received at $t=t_{delay}$. Because the safety chain break was caused by the drive controller 12 issuing a safety chain break command, $t_{delay}$ is equal to or greater than the minimum propagation time $t_{min}$. The drive controller 12 thus recognises that the safety chain information is indicative of the safety chain break it triggered itself and that the underlying cause of the drop in power output is indeed a drive hardware fault. The controller thus, in step 608, classifies the fault as a drive hardware fault.

Figure 8:
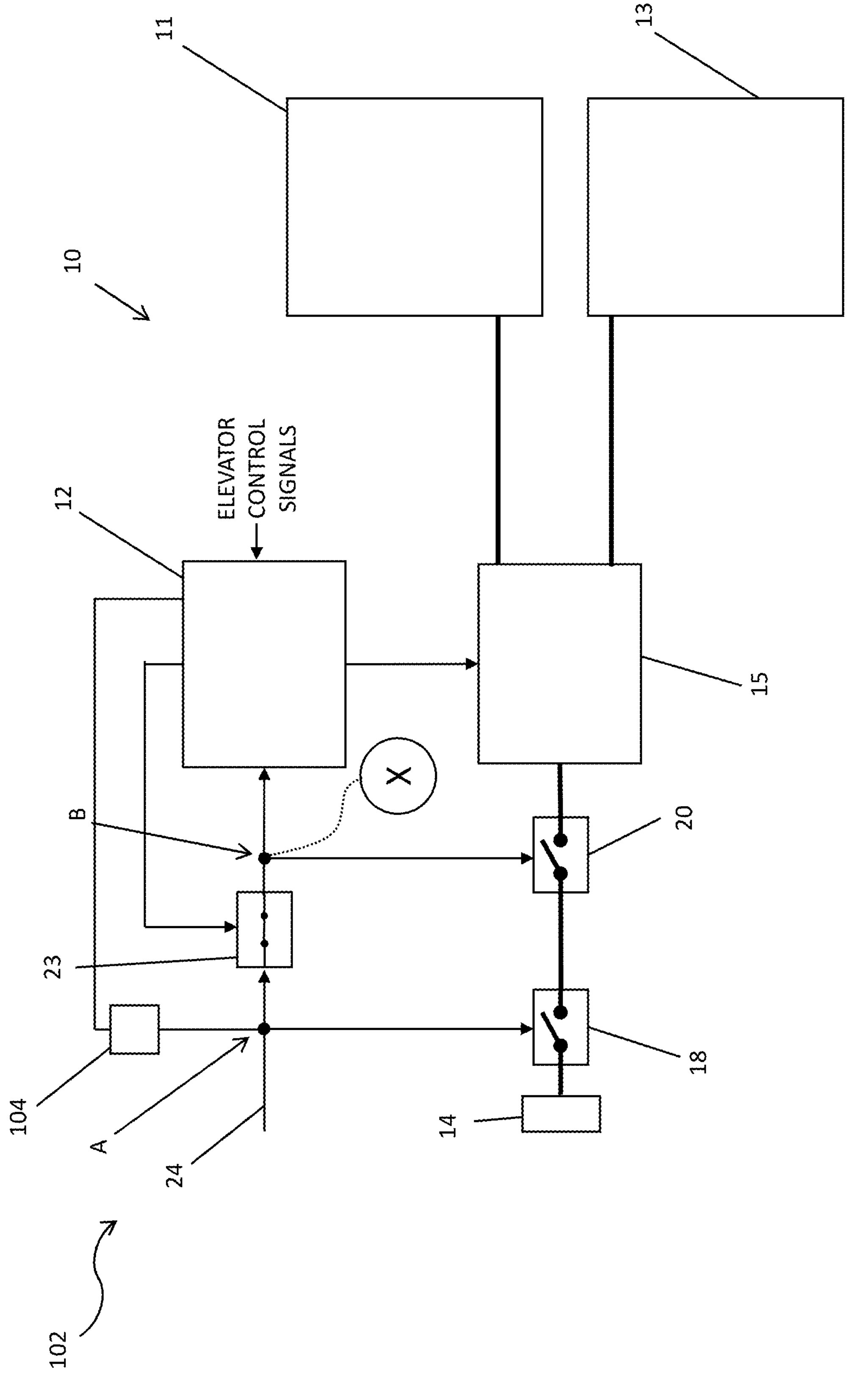
FIG. 8 is a schematic view of an elevator system according to another example of the present disclosure.

FIG. 8 shows an elevator system 102 according to another example of the present disclosure. The elevator system 102 comprises all the components of the elevator system 2 shown in FIG. 1 and further comprises a voltage sensor 104 connected directly to the drive controller 12 and arranged to measure a voltage of the safety chain at node A of the safety chain 16 at a fast rate (e.g. making more than 50 measurements per second). The drive controller 12 thus receives substantially continuously safety chain information comprising measurements of the voltage of the electrical safety chain signal.

Figure 9:
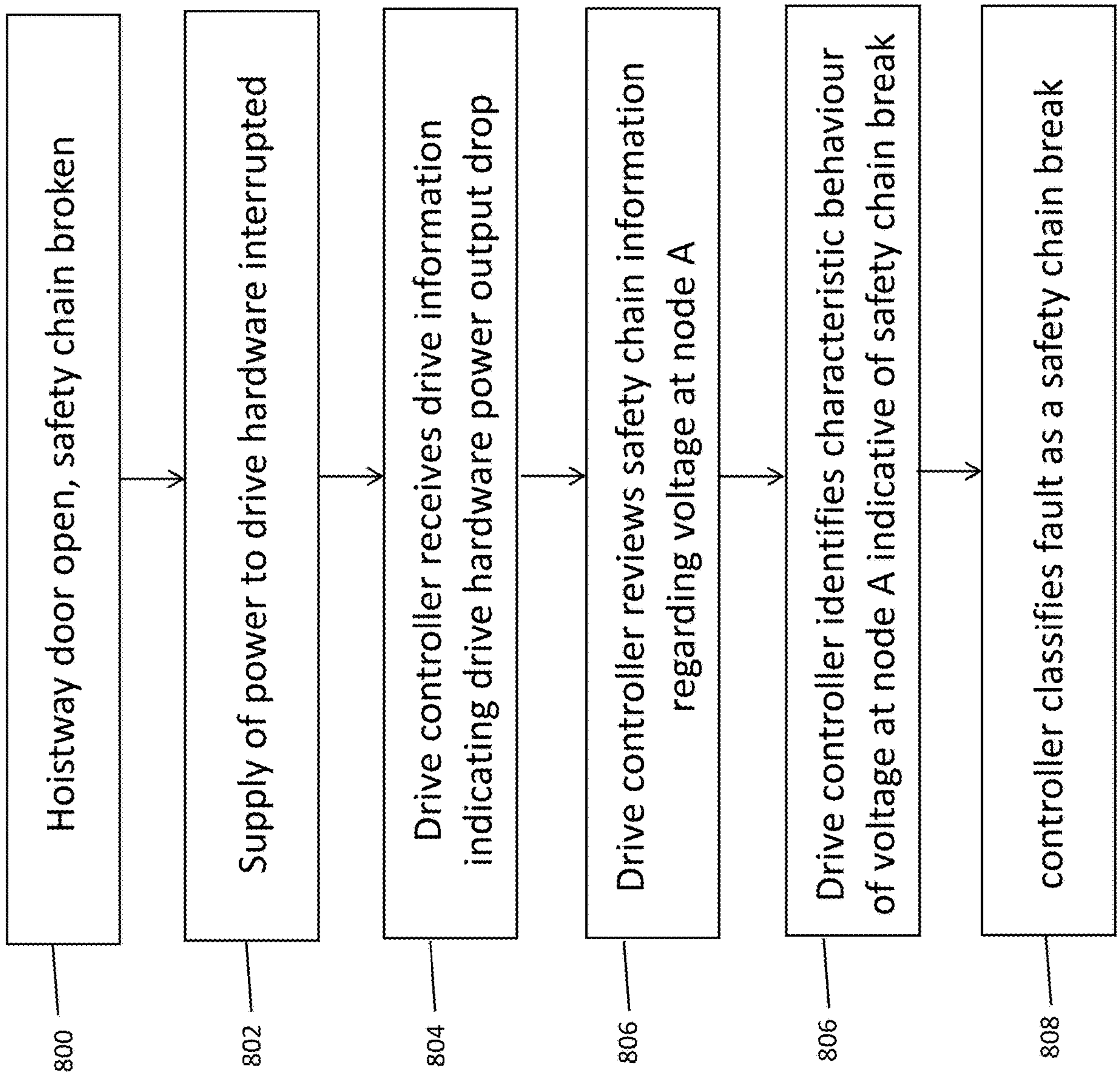
FIG. 9 is a flow diagram illustrating the operation of the elevator system shown in FIG. 8 when a safety chain break occurs.

The operation of the elevator system 102 when a safety chain break occurs will now be explained with reference to FIGS. 8 and 9.

At step 800, a hoistway door 8 is erroneously left open (e.g. due to a failure of its closing mechanism), causing its corresponding switch 22 to open and break the safety chain 16. Because the electrical safety chain signal is no longer carried to nodes A or B, the first and second power supply relays 18, 20 open and the supply of power to the drive hardware 15 is interrupted (step 802). This stops the drive motor 11 and applies the safety brake 13, bringing the elevator car 4 to a halt (or preventing it from moving if it is already stopped).

At step 804, the drive controller 12 receives drive information from the drive hardware 15 indicating a sudden drop in power output (due to the interruption of the power supply). At step 806 the drive controller 12 reviews the voltage measured by the voltage sensor 104 from a time period leading up to the drive information being received.

In step 806, the drive controller identifies behaviour of the voltage at the safety chain at node A in the reviewed time period that is characteristic of a safety chain break. The drive controller 12 therefore classifies in step 808 the fault as a safety chain break which subsequently caused the supply of power to the drive hardware 10 to be interrupted. In other examples different properties of the electrical safety chain signal may be measured. Thus, in other examples, the voltage monitor 104 may be replaced with a more general safety chain monitoring device 104 capable of measuring different (and possibly several) properties of the safety chain 16. For example, in the case of an AC safety chain 16, the safety chain monitoring device 104 may monitor the frequency of the AC signal. It may, of course, also monitor the voltage of the safety chain 16 (e.g. peak voltage, RMS voltage, etc.). In some examples, the safety chain monitoring device 104 (or the drive controller 12) may be arranged to determine the frequency of the AC signal using a plurality of voltage measurements over time. In some examples the safety chain monitoring device 104 may be an integral part of the drive controller 12.

While the disclosure has been described in detail in connection with only a limited number of examples, it should be readily understood that the disclosure is not limited to such disclosed examples. Rather, the disclosure can be modified to incorporate any number of variations, alterations, substitutions or equivalent arrangements not heretofore described, but which are commensurate with the scope of the disclosure. Additionally, while various examples of the disclosure have been described, it is to be understood that aspects of the disclosure may include only some of the described examples. Accordingly, the disclosure is not to be seen as limited by the foregoing description, but is only limited by the scope of the appended claims.

What is claimed is:

1. An elevator system (2, 102) comprising:

a drive system (10) comprising one or more drive components (11, 13) and drive hardware (15) for controlling the supply of power to the one or more drive components (11, 13);

a safety chain (16) arranged to break and thus interrupt the supply of power to the one or more drive components (11, 13), unless all of one or more safety condition(s) is satisfied; and a control device (12) arranged:

to receive drive information from the drive hardware (15) indicative of a drive system fault;

to receive safety chain information from the safety chain (16) indicative of a safety chain break; and to detect and classify a fault in the elevator system (2, 102) using the drive information and the safety chain information, wherein the safety chain is arranged to break and thus interrupt a supply of power to the one or more drive components (11, 13) on reception of a safety chain break command from the control device (12);

wherein the control device (12) is arranged:

to issue a safety chain break command to the safety chain (16) on reception of drive information from the drive hardware (15) indicative of a drive system fault;

to measure a time delay between issuing the safety chain break command and receiving safety chain information from the safety chain (16) indicative of a safety chain break;

to determine if the time delay is less than a minimum expected propagation time; and if the time delay is less than the minimum expected propagation delay, to classify the fault as a safety chain break.

2. The elevator system (2, 102) of claim 1, wherein the safety chain is arranged to break and thus interrupt a supply of power to the one or more drive components (11, 13) on reception of a safety chain break command from the control device (12).

3. The elevator system (2, 102) of claim 1, wherein the control device (12) is arranged, if the time delay is equal to or greater than the minimum expected propagation delay, to classify the fault as a drive system fault.

4. The elevator system (2, 102) of claim 1, wherein the safety chain (16) comprises a plurality of electrical switches (22) connected in series via a conducting path (24) and arranged to carry an electrical safety chain signal to an end of the conducting path (24), wherein each of the switches (22) is arranged to break the safety chain (16) by interrupting the conducting path (24) unless a respective safety condition is satisfied.

5. The elevator system (2, 102) of claim 4, wherein the safety chain (16) comprises a further switch (23) arranged to break the safety chain (16) by interrupting the conducting path (24) on reception of a safety chain break command from the control device (12).

6. The elevator system (2, 102) of claim 4, wherein the control device (12) is connected to the end of the conducting path (24) and is arranged to detect the presence or absence of the electrical safety chain signal at the end of the conducting path (24), wherein the safety chain information received by the control device (12) indicative of a safety chain break comprises the absence of the electrical safety chain signal at the end of the conducting path (24).

7. The elevator system (2, 102) of claim 6, wherein the control device (12) is connected to the conducting path (24) via one or more filters or amplifiers.

8. The elevator system (2, 102) of claim 4, comprising a power supply switch (20) controlled by the electrical safety chain signal and via which the one or more drive components (11, 13) is supplied with power, wherein the power supply switch (20) is arranged to conduct power only when the safety chain signal is present at the end of the conducting path (24).

9. The elevator system (2, 102) of claim 4, wherein the control device (12) is arranged to receive safety chain information comprising a plurality of measurements of one or more properties of the electrical safety chain signal carried by the safety chain (16).

10. The elevator system (2, 102) of claim 9, wherein the safety chain information comprises a plurality of measurements of one or more continuously variable properties of the electrical safety chain signal.

11. The elevator system (2, 102) of claim 9, wherein the control device (12) is arranged to store safety chain information and to classify retroactively a fault based on stored safety chain information.

12. The elevator system (20, 102) of claim 1, wherein the drive information comprises one or more of a power, current or voltage output of the drive hardware (15).

13. The elevator system of claim 1, wherein the control device is configured to:

perform a self-test of the safety chain by issuing a test command and monitoring a response;

compare the response to a threshold to detect a safety chain break; and adjust the threshold for classifying the safety chain break.

14. The elevator system of claim 13, wherein the threshold comprises a propagation time of the response to the test command.

* * * * *